(12) United States Patent
Liu

(10) Patent No.: US 7,014,217 B2
(45) Date of Patent: Mar. 21, 2006

(54) PIPE CONNECTOR

(76) Inventor: Pao-Chuan Liu, No. 149, Jhonglu, Jhonglu Village, Alian Township, Kaohsiung County (TW)

( * ) Notice: Subject to any disclaimer, the term of this patent is extended or adjusted under 35 U.S.C. 154(b) by 0 days.

(21) Appl. No.: 10/749,404

(22) Filed: Jan. 2, 2004

(65) Prior Publication Data

US 2005/0146135 A1    Jul. 7, 2005

(51) Int. Cl.
*F16L 33/00*   (2006.01)

(52) U.S. Cl. .................... 285/255; 285/249; 285/332.2

(58) Field of Classification Search ............... 285/241, 285/245, 249, 255, 247, 248, 332.2
See application file for complete search history.

(56) References Cited

U.S. PATENT DOCUMENTS 3,404,905 A * 10/1968 Albrecht .................. 285/249
4,906,028 A *  3/1990 Yokomatsu et al. ........ 285/255
5,558,375 A *  9/1996 Newman .................. 285/249
6,746,055 B1 * 6/2004 Wood et al. .............. 285/249

FOREIGN PATENT DOCUMENTS

| JP | 1316594 | * 12/1989 | ................ 285/249 |
| JP | 2163591 | *  6/1990 | ................ 285/249 |
| JP | 2163592 | *  6/1990 | ................ 285/249 |

* cited by examiner

*Primary Examiner*—David Bochna
(74) *Attorney, Agent, or Firm*—Birch, Stewart, Kolasch & Birch, LLP

(57) ABSTRACT

An improved pipe connector includes a fastening member between two connecting pipes. The fastening member has a fastening section on one end coupling with a pad sleeve. The fastening section is coupled with a bracing sleeve from outside for housing a pipe. A sleeve cap with a sloped harness hole is used to compress the pipe with a contracted force that couples two pipes at two ends of the fastening member. The fastening member may be adjusted angularly according to onsite requirements to achieve smooth connection and fastening of the pipes without skewing or forming a gap therebetween.

15 Claims, 5 Drawing Sheets

PIPE CONNECTOR

FIELD OF THE INVENTION

The present invention relates to a pipe connector that has a guarding member on one end of a pipe to house a sleeve cap which has a harness hole to generate a contracting force to compress the pipe to form a secured fastening between two pipes.

BACKGROUND OF THE INVENTION

At present the methods for connecting two pipes use screw threads on the end of both pipes. While the threaded ends look like they are fastened tightly, actually there are problems; notably:
1. Conventional connecting the ends of two pipes using internal and external threads. The distal threaded ends of the two pipes are not always aligned. They should be bent slightly for alignment after coupling. This tends to cause damage to the connecting ends and affects the service life of the pipes.
2. To couple the external and internal threaded ends of the pipes, the pipes should be turned to reach the fastening position. Once reached, the two pipes still have to be twisted to attain the most suitable connecting positions. Twisting one of the pipes forcibly could easily generate a gap between the two ends and result in undesirable fluid leakage therein.

SUMMARY OF THE INVENTION

In view of the aforesaid disadvantages, the present invention aims to provide an improved pipe connector that has a sloped harness hole in a sleeve cap to generate a contracting force to compress the pipes. The two pipes are retained at both ends of a fastening member which may be adjusted angularly according to onsite requirements to achieve a more secure fastening for the pipes.

The main feature of the invention is to form a sloped harness hole in a sleeve cap to couple with a fastening member that is coupled with a pad sleeve so that the harness hole can generate a contracting force to compress the pipes to be connected and achieve a secure fastening.

By means of the invention, the following advantages can be achieved:
1. The sloped harness hole of the sleeve cap is coupled from outside of the pipe to a fastening section. It forms an annular compression to gradually constrict the pipes and maintain a precise position.
2. The sloped harness hole of the sleeve cap can prevent the connecting ends of the two pipes from screw dead-locks or leakages thus can result in a smooth connection and flow path.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
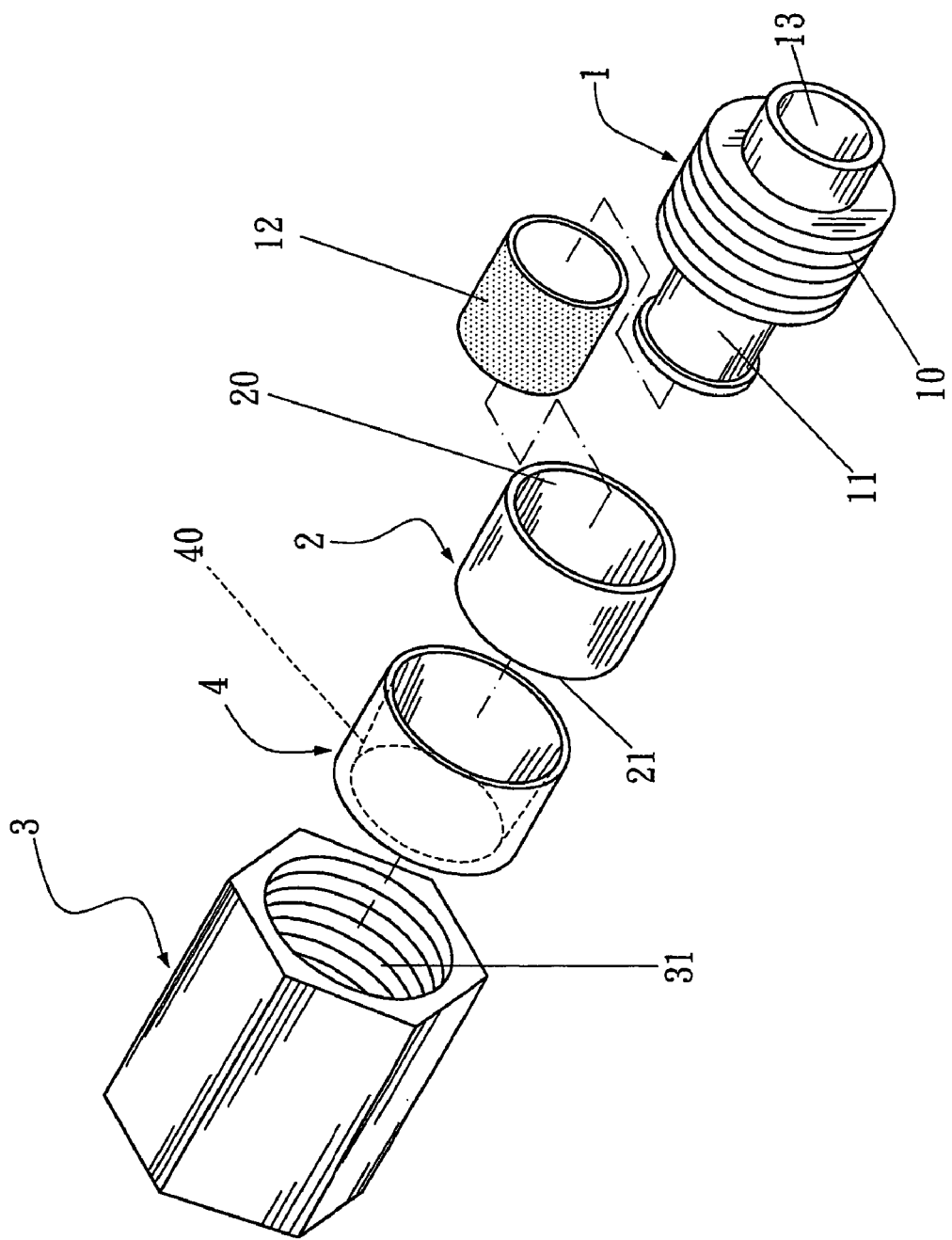
FIG. 1 is an exploded view of the present invention.
Figure 2:
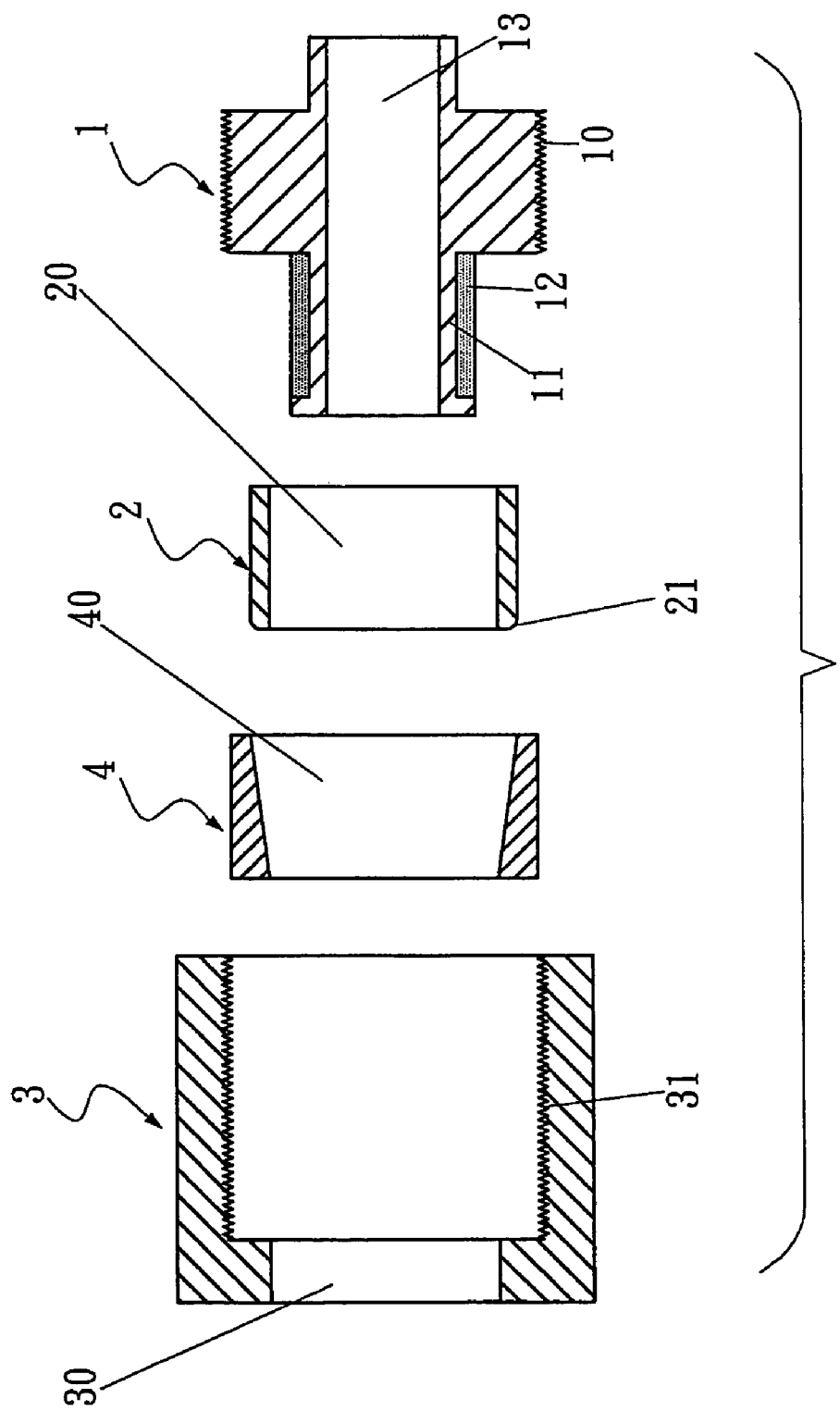
FIG. 2 is a side view of the invention before assembly.
Figure 3:
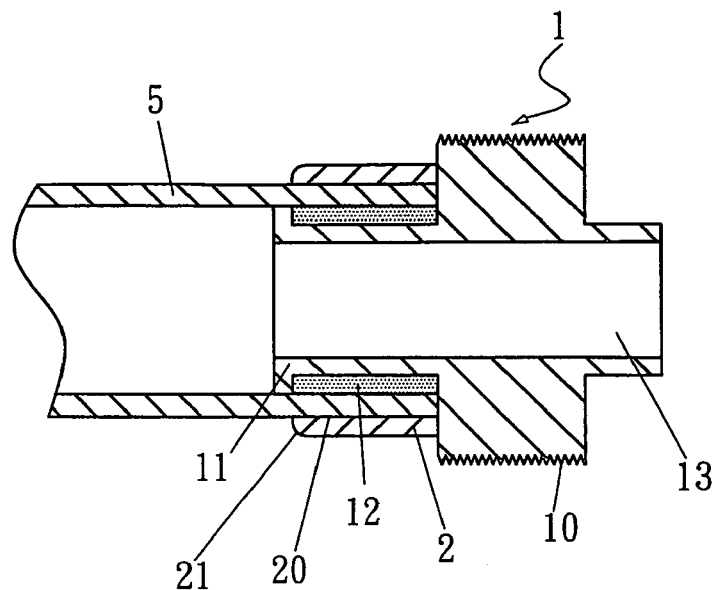
FIG. 3 is a side view of the invention with a fastening member and a sleeve cap coupled to a pipe.

Please refer to FIGS. 1, 2 and 3, the invention includes a fastening member 1 and a bracing sleeve 2 to couple by tightening the guarding member 3 which houses a sleeve cap 4 inside to compress a pipe 5 to tightly to fasten and achieve a smooth connection.

The fastening member 1 has one end forming an external thread section 10 and other end extended to form a fastening section 11 to couple with a pad sleeve 12 from the outside. The fastening member 1 has a hole 13 through the center.

The bracing sleeve 2 has a bore 20 in the center to allow the pipe 5 to pass through and also couple with the fastening section 11 from the outside. The other end forms a curved edge 21.

The guarding member 3 has a hole 30 in the center of one side to allow the pipe 5 to run through and the other side forms an internal threaded hole 31 to couple with the external thread section 10 of the fastening member 1.

The sleeve cap 4 has an outer dimension to be housed in the guarding member 3 at the bottom end of the internal threaded hole 31 and has a sloped harness hole 40 at its center.

Figure 4:
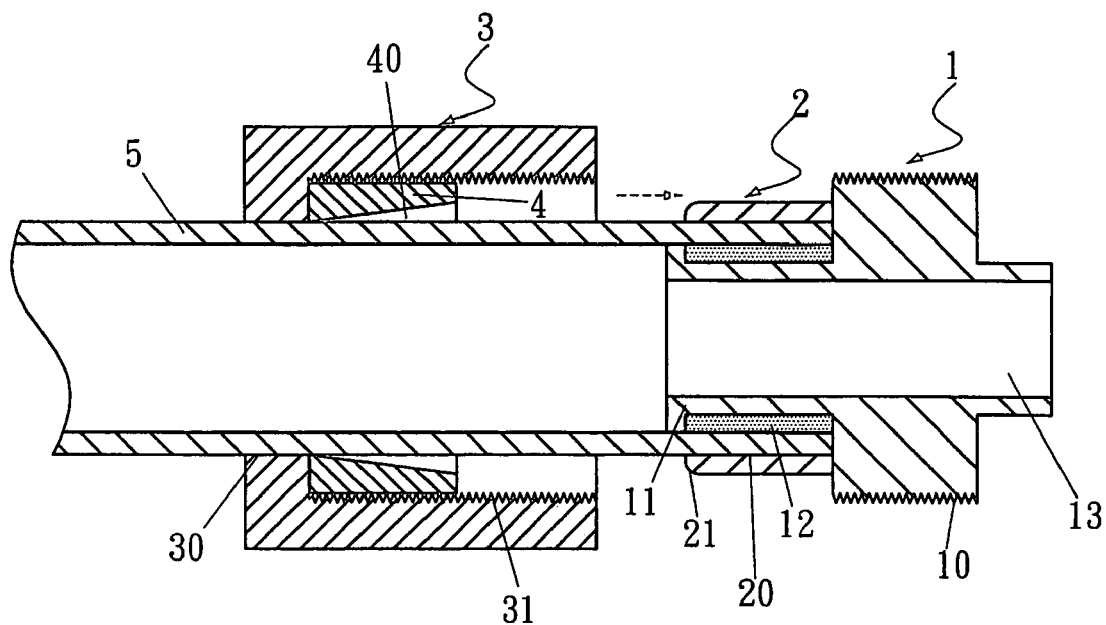
FIG. 4 is a side view of the invention with a guarding member to couple with a fastening member.
Figure 5:
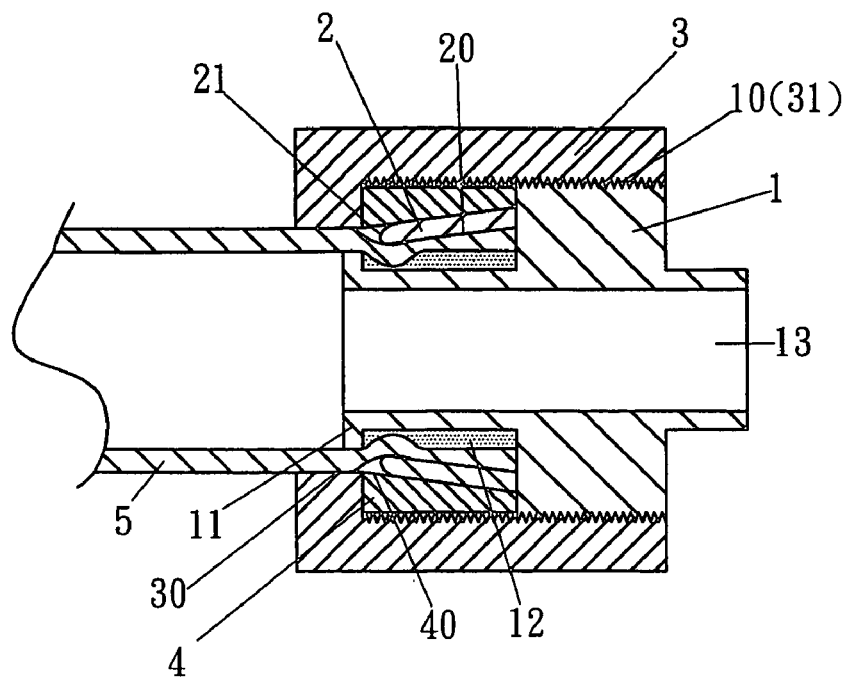
FIG. 5 is a side view of the invention with a guarding member coupled with a fastening member.

For assembly (referring to FIG. 3), couple the pipe 5 on the fastening section 11 of the fastening member 1 that is surrounded by the pad sleeve 12; couple the bracing sleeve 2 on the pipe 5 from outside; screw the internal threaded hole 31 of the guarding member 3 with the external thread section 10 of the fastening member 1. When screwing, the harness hole 40 of the sleeve cap 4 gradually moves towards the curved edge 21 of the bracing sleeve 2 and compresses the pipe 5 (referring to FIGS. 4 and 5) so that the pipe 5 is fastened tightly. Thus the two pipes may be coupled smoothly without skewing or forming a gap.

Figure 6:
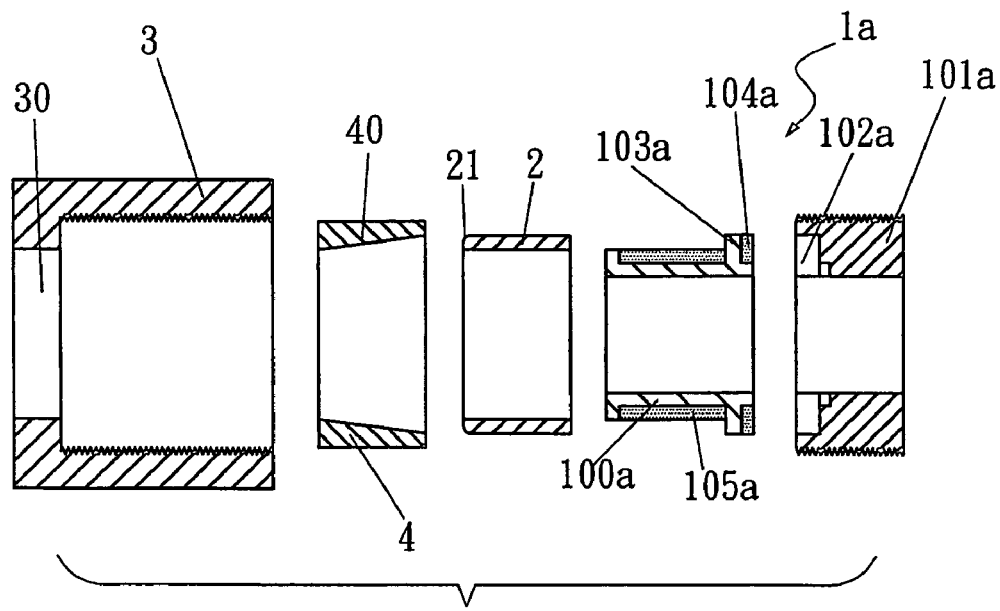
FIG. 6 is a side view of another embodiment of the invention.
Figure 7:
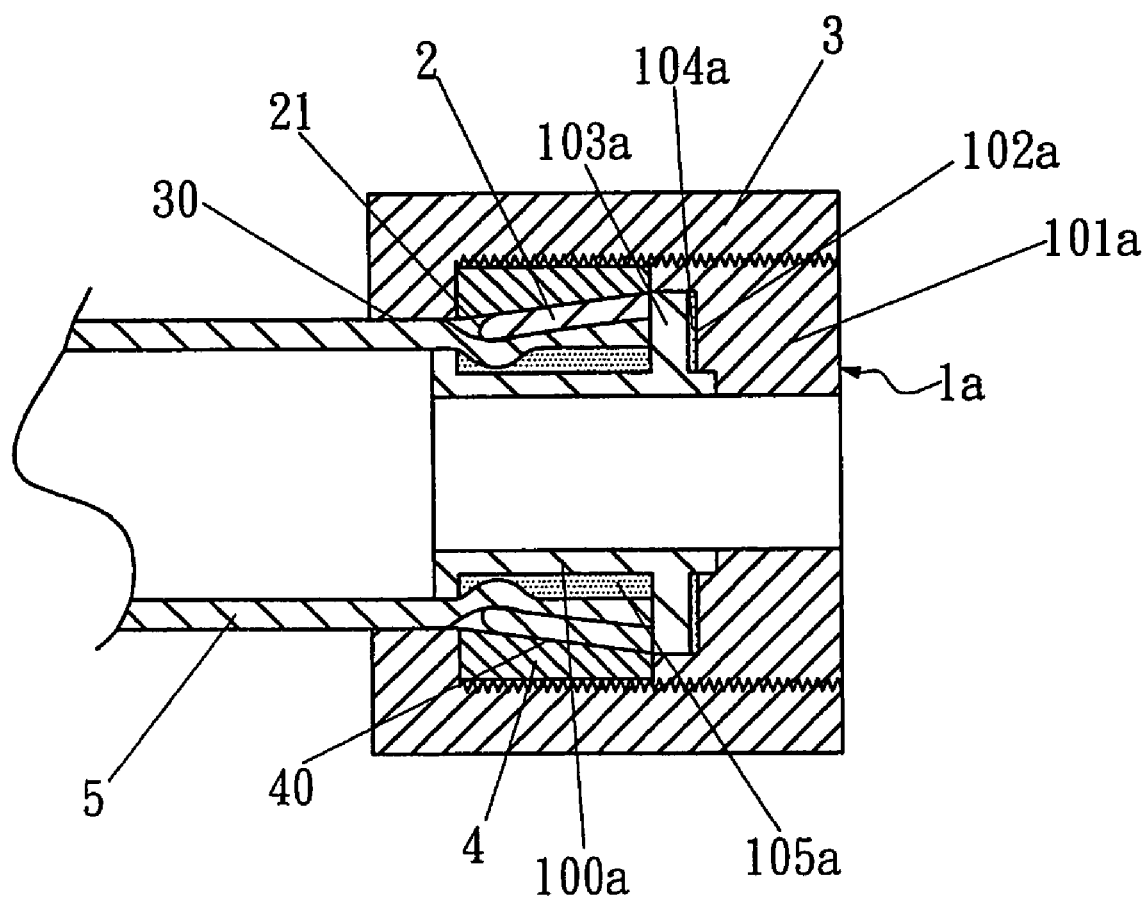
FIG. 7 is a side view of the invention after joining the two pipes according to FIG. 6.

Refer to FIG. 6 and FIG. 7 for another embodiment of the invention. It is constructed substantially like the embodiment shown in FIG. 1. The main difference is that the fastening member 1a consists of a left side member 100a and a right side member 101a. The right side member 111a has a housing zone 102a on one side. The left side member 100a has a flange 103a on one side with the same diameter as the housing zone that is coupled with a pad ring 104a to be housed in the housing zone 102a. The left side member 100a has another side coupled with a pad sleeve 105a. The other side of the left side member 100a may be coupled with a pipe 5. Then the guarding member 3 can screw onto the fastening member 1a. When screwing, the harness hole 40 of the sleeve cap 4 in the guarding member 3 gradually moves towards the curved edge 21 of the bracing sleeve 2 and compresses the pipe 5 to form a secured fastening (referring to FIG. 7).

In summary, the sleeve cap of the invention has a sloped harness hole to confine the connection of the pipes so that screw coupling of the two pipes may be accomplished smoothly without skewing or forming a gap in the join; therefor a secure fastening can be achieved. The present invention may also be adapted to connect and fasten any other type of pipe (such as connecting three-way pipes, two-way pipes, or elbow pipes, and the like).

What is claimed is:

1. A pipe connector, comprising:
    a fastening member having a fastening section on one end coupling with a bracing sleeve and an external thread section on the other end, the bracing sleeve having one end forming a curved edge and a bore inside for housing a pipe;
    a guarding member having an internal thread hole to couple with the external thread section and housing a sleeve cap which has a harness hole inside to gradually move towards the bracing sleeve over the curved edge when the guarding member is screwed with the fastening member to compress the pipe to form a secured fastening; and
    a pad sleeve coupled to an outside of the fastening section, the pad sleeve being between the fastening section and the bracing sleeve.

2. The pipe connector of claim 1, wherein the harness hole of the sleeve cap is a sloped hole with a smaller inner diameter and a larger outer diameter.

3. The pipe connector of claim 1, wherein the pipe is selected from the group consisting of a three-way pipe, a two-way pipe or an elbow pipe.

4. The pipe connector of claim 1, wherein the fastening member includes a left side member and a right side member that are coupled together.

5. The pipe connector of claim 4, wherein the right side member has one side forming a housing zone.

6. The pipe connector of claim 5, wherein the left side member has a flange on one side and is coupled with the pad sleeve.

7. The pipe connector of claim 4, wherein the left side member has a flange on one side and is coupled with the pad sleeve.

8. The pipe connector of claim 1, wherein the pipe is inserted between the pad sleeve and the bracing sleeve.

9. The pipe connector of claim 8, wherein the harness hole of the sleeve cap is sloped with a smaller inner diameter and a larger outer diameter.

10. The pipe connector of claim 9, wherein an inside of the guarding member directly engages the sleeve cap.

11. The pipe connector of claim 10, wherein the fastening member and the fastening section are a one-piece element.

12. The pipe connector of claim 11, wherein the pipe is unbent between an outer end of the guarding member and an outer end of the fastening section when the pipe is compressed to form the secured fastening.

13. The pipe connector of claim 1, wherein an inside of the guarding member directly engages the sleeve cap.

14. The pipe connector of claim 1, wherein the fastening member and the fastening section are a one-piece element.

15. The pipe connector of claim 1, wherein the pipe is unbent between an outer end of the guarding member and an outer end of the fastening section when the pipe is compressed to form the secured fastening.

* * * * *